United States Patent [19]

Arcari

[11] Patent Number: 4,765,364

[45] Date of Patent: Aug. 23, 1988

[54] PRESSURE ACTIVATED VALVE FOR SANITARY SYSTEMS

[75] Inventor: Mario A. Arcari, Chicago, Ill.

[73] Assignee: Manager Systems Incorporated, Riverwoods, Ill.

[21] Appl. No.: 121,062

[22] Filed: Nov. 16, 1987

[51] Int. Cl.[4] .............................................. F16K 15/06
[52] U.S. Cl. ................................. 137/536; 137/515.5; 137/541; 137/542
[58] Field of Search ..................... 137/515, 515.5, 536, 137/541, 542

[56] References Cited

U.S. PATENT DOCUMENTS

| | | | |
|---|---|---|---|
| 318,961 | 6/1885 | Crosby | 137/536 |
| 320,280 | 6/1885 | Pearson | 137/536 |
| 1,260,663 | 3/1918 | Gould et al. | 137/541 |
| 2,602,631 | 7/1952 | Eickmeyer | 137/536 X |
| 3,182,682 | 5/1965 | Gilliam | 137/515.5 |
| 3,749,122 | 7/1973 | Gold | 137/542 X |
| 4,485,844 | 12/1984 | Vander Kaay et al. | 137/536 X |
| 4,614,661 | 9/1986 | White et al. | 137/541 X |

*Primary Examiner*—John Rivell
*Attorney, Agent, or Firm*—Dick and Harris

[57] ABSTRACT

A pressure activated valve apparatus for axial in-line positioning within sanitary systems, such as steam lines for food processing, in which the entire apparatus, including the spring biasing and valve elements are positioned within the flowing media. The spring biasing element is protected from contact with the flowing media, through the use of a sealed fluid-dynamic cover so as to allow the passing media to flow over it with a minimum amount of resistance. The entire apparatus is connected to an incoming and an outgoing conduit so as to enable easy removal for replacement or maintenance purposes, with a minimum amount of cost and effort. A fluid-dynamic cover is fitted over portions of the valve assembly to isolate same from the fluid itself, while being removable to enable facilitated replacement or maintenance of the internal valve actuation parts.

11 Claims, 1 Drawing Sheet

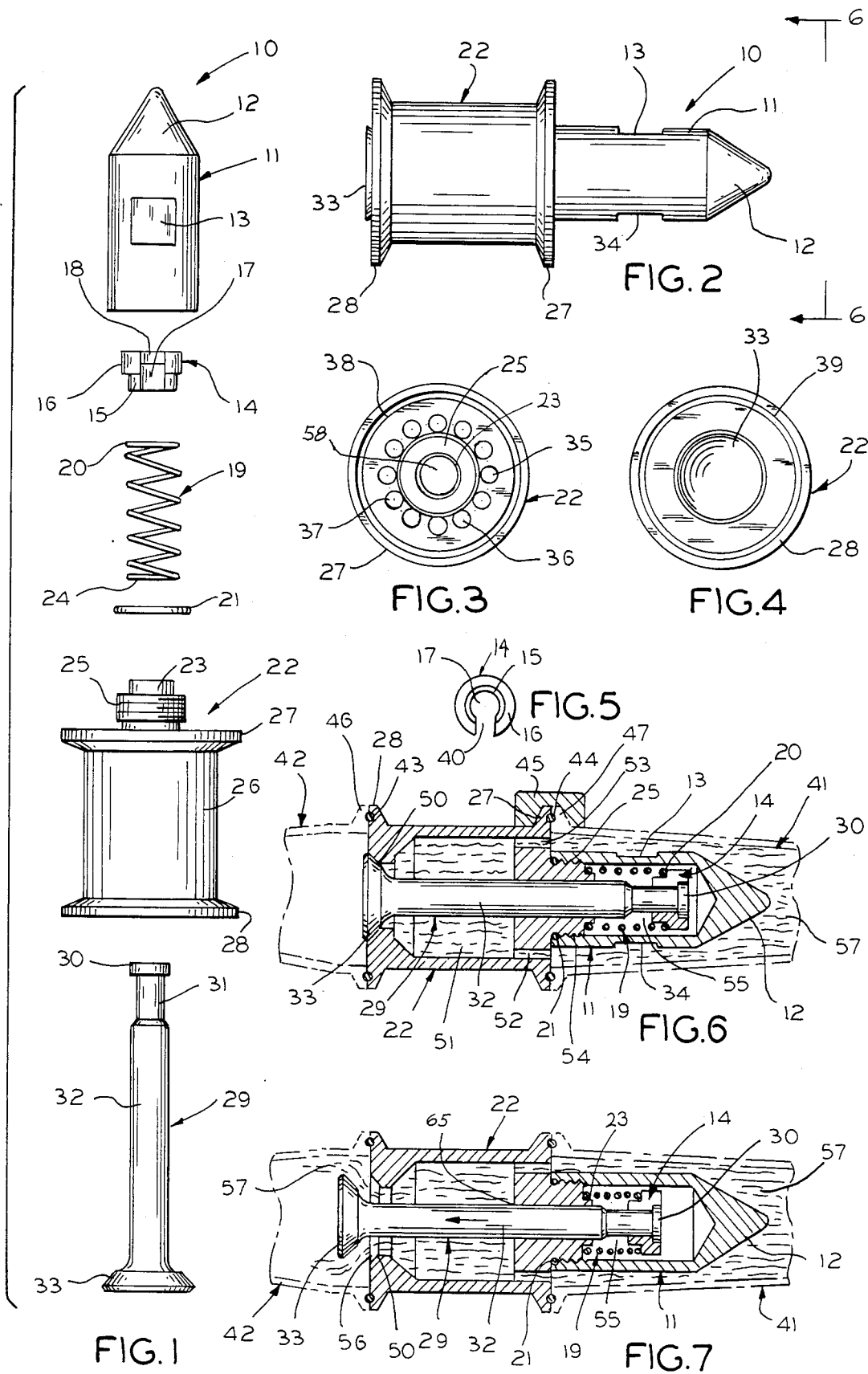

PRESSURE ACTIVATED VALVE FOR SANITARY SYSTEMS

BACKGROUND OF THE INVENTION

The present invention relates in general to valves and, in particular, to a pressure activated valve apparatus for use in sanitary systems where the entire valve apparatus is located within the flowing media, and where a protected valve spring assembly is positioned upstream of the flow of the media in relation to the valve stem closure member.

For decades, various means have been utilized to employ spring biased pressure relief valves in systems controlling the flow of fluids. While the vast majority of such valves have typically utilized spring biasing means for the valves that are externally located, relative to the fluid flow within the system, some valves have adopted axially in-line positioned spring biasing means relative to in-line valve stem closure members, and have internally positioned the entire apparatus within the particular system. Among the prior art devices relying upon and/or disclosing utilization of an axially in-line valve apparatus having spring biasing means immersed in the flowing media, are U.S. Pat. Nos. 754,569; 1,889,503; 2,063,821; and 2,809,660. In spite of these developments in spring biased valve devices, few, if any, reveal a spring biasing means located upstream of the valve apparatus through which the fluid is directed, relative to the valve stem closure member. Further, few, if any, prior art devices provide for a removable, sealed fluid-dynamic spring biasing means cover to isolate most of the moving parts of the valve, while minimizing the resistance of the flowing media passing over it, while additionally providing easy access for replacement and/or maintenance of same.

It is thus an object of the present invention to provide a pressure activated valve apparatus incorporating a valve spring biasing means, wherein the entire device is immersable axially and in-line with the flowing media, such as steam lines in food processing systems—where the valve spring biasing means is protected against exposure to the flowing media so as to avoid contamination from the spring biasing means to downstream fluids emanating into the system.

Another object of the invention is to provide such a pressure activated valve apparatus in which individual components of the apparatus, if desired, may be easily repaired or replaced with a minimum of effort and cost.

It is additionally an object of the invention to operably provide spring biasing means and a fluid-dynamic sealed cover therefor, operably separated from the valve housing itself, which cover is removable, so that the fluid flowing over it will pass with minimum resistance, while providing easy access to the protected inner valve components.

These and other objects of the invention will become apparent in light of the present specification and drawings.

SUMMARY OF THE INVENTION

The present invention comprises an in-line pressure activated valve apparatus for integration into sanitary fluid conveyance systems for alternatively blocking and releasing the flow of fluid therethrough, relative to the level of fluid pressure within the system.

The apparatus comprises a cylindrical housing means having a first end at which the fluid is introduced through an aperture, and a second opposite end having a second aperture at which the fluid is alternatively blocked and released. The first end of the cylindrical housing means is operably attached to an incoming conduit means. The second end of the cylindrical housing means is operably attached to an outgoing conduit means. The cylindrical housing means is positioned wholly axially and in-line between the incoming and outgoing conduit means. The cylindrical housing means further comprises an internal fluid passage means about the longitudinal axis of the cylindrical housing means, for permitting the fluid in the released position to flow between the first and second opposite ends of the cylindrical housing means. The cylindrical housing means further comprises a substantially concentrically positioned outwardly protruding valve attachment means which is operably secured to the first end of the cylindrical housing means so that it can be operably positioned within the incoming conduit means.

Valve means are operably and springedly attached at the valve attachment means so as to enable operable reciprocation within and through the cylindrical housing means. The valve means consist of a valve stem member having a valve head at the first end of the cylindrical housing means, and a valve closure at the second end of the cylindrical housing means which is opposite the first end. The valve means also consists of a spring biasing means which is operably interposed between the valve means and the cylindrical housing means so as to enable biased reciprocation of the valve stem member, which in turn, seats and unseats the valve closure with respect to the aperture located at the second end of the cylindrical housing means, which alternatively restricts and releases, respectively, the flow of the fluid passing through the internal fluid passage means of the cylindrical housing means. The spring biasing means is operably interposed between the valve attachment means and the valve stem valve head. The level of fluid pressure within the cylindrical housing means serves to bear against the valve closure to overcome and compress the spring biasing means so as to unseat the valve closure from its seated position upon attainment of a predetermined pressure, so as, in turn, to release the fluid from the aperture located at the second end of the cylindrical housing means.

The spring biasing means co-operates with the valve closure so as to seat the valve against the aperture located on the second end of the cylindrical housing means, so as to block the flow of the fluid through the internal fluid passage means of the cylindrical housing means until the spring biasing means is overcome by the pressure of the fluid within the cylindrical housing means, thereby resisting the backflow of fluids downstream from the valve apparatus. The spring biasing means is longitudinally positioned axially and in-line with the cylindrical housing means, and it is located upstream of the cylindrical housing means within the first incoming conduit means.

Sealed secondary housing means are operably and sealably attached to and about the outwardly protruding valve attachment means so that the spring biasing means, the valve head, and the valve attachment means can be isolated from undesired contact with the fluid which is passing thereabout. The secondary housing means comprises a substantially fluid-dynamic shaped member so as to minimize the resistance of the flow of the fluid which is entering the valve from the incoming conduit means and passing through the pressure activated valve apparatus. The secondary housing means is further fixedly sealed, while being removably attachable to the outer periphery of the valve attachment means, so as to enable facilitated access to the spring biasing means and the valve head, for each of their respective maintenance and replacement.

In a preferred embodiment of the invention, the cylindrical housing means includes at its first and second ends, recessed grooves so as to enable the provision of sealing means so as to prevent leakage of the fluid upon operable sealed attachment of the first end of the cylindrical housing means to the incoming conduit means, as well as to prevent leakage at the second end where attached to the outgoing conduit means.

In the preferred embodiment of the invention, the aperture located at the first end of the cylindrical housing means, comprises a plurality of holes which are operably and radially positioned about the longitudinal axis of the valve housing at the first end of the cylindrical housing means, from which the outwardly protruding valve attachment means emanates, so as to enable flow of the fluid from the incoming conduit means to and into the internal fluid passage means of the cylindrical housing means.

In the preferred embodiment of the invention, the aperture which is located at the second end of the cylindrical housing means, comprises a single release aperture for release of the fluid into the outgoing conduit means. The single release aperture has valve seating means positioned thereabout the outside of the said aperture so as to enable seating of the valve closure.

In the preferred embodiment of the invention, the valve attachment means comprises an outwardly protruding cylindrical stem member which has external threading positioned around it so as to enable attachment of the secondary housing means. Likewise, the secondary housing means includes internal threading for co-operation with the external threads of the valve attachment means. The internal threading thereby provides removable affixation to the valve attachment means.

The pressure activated release valve apparatus further includes valve sealing means which are radially and concentrically positioned about the periphery of the valve attachment means so as to preclude the inadvertent migration of the fluid into the secondary housing means which is attached to the valve attachment means. The valve sealing means is positioned around the lower emanating portion of the outwardly protruding valve attachment means where the bottom of the secondary housing means meets with the cylindrical housing means. Additionally, the valve sealing means bears against the bottom of the secondary housing means so as to isolate the interior of the secondary housing means from the fluid. In this preferred embodiment, the valve sealing means comprises a substantially elastomeric O-ring.

The pressure activated valve apparatus further includes spring retaining means used for securing the spring biasing means between the cylindrical housing means and the valve head of the valve stem. The spring retaining means consists of a releasable valve head element which is attachable to the first end of the valve stem member. Furthermore, the releasable valve head element also includes a singular radially offset longitudinal slot which facilitates the removal and replacement of the spring retaining means from about the valve stem member. This singular slot of the valve head element consists of a longitudinal opening which is larger than the diameter of the valve stem member.

In the preferred embodiment of the invention, the secondary housing means is substantially conical in shape so as to reduce resistance of the flow of the fluid. This substantially conical-shaped secondary housing means further consists of a tapered fluid-dynamic tip so as to further minimize the resistance of the fluid flowing over it. The taper of the tapered tip begins at a distance at least as long as the protruding length of the valve stem, when the valve closure is in its seated flow blocking position.

In this embodiment, the secondary housing means further includes at least two slotted flats which are positioned opposite each other. These slotted flats are located on the outer periphery of the secondary housing means so as to allow wrenching to enable the secondary housing means to be tightened and loosened from the valve attachment means.

BRIEF DESCRIPTION OF THE DRAWINGS

FIG. 1 of the drawings is an exploded side view of the pressure activated valve apparatus showing, in particular, the invention's secondary housing cover, valve head, valve spring, valve seal, protruding valve attachment, the cylindrical housing, and valve stem components;

FIG. 2 of the drawings is an elevated side view of the pressure activated valve apparatus showing the positioning of the secondary housing relative to the cylindrical housing as well as the valve stem closure member in its seated position;

FIG. 3 of the drawings is a top plan view of the cylindrical housing apart from the pressure activated valve apparatus as a whole, particularly revealing the plurality of holes radially positioned about the protruding valve attachment, through which fluid can enter the cylindrical housing together with a sealing groove thereabout;

FIG. 4 of the drawings is a bottom plan view of the pressure activated valve apparatus particularly showing the recessed sealing groove about the outer periphery of the second, rear side, of the cylindrical housing, as well as the operable position of the valve stem closure member therewithin;

FIG. 5 of the drawings is a bottom plan view of the removable valve head element particularly showing its singular longitudinal slot;

FIG. 6 of the drawings is an elevated side cross sectional view of the pressure activated valve apparatus in its operating environment, taken along lines 6—6 and looking in the direction of the arrows in operable alignment with the incoming and outgoing conduits, particularly showing the valve stem closure member in a seated position thereby restricting the flow of fluid and also showing the secondary housing about the valve spring immersed in the fluid flow, in a position upstream in relation to both the valve stem closure member and valve housing means;

FIG. 7 is an elevated side cross sectional view of the pressure activated valve apparatus of FIG. 6, particularly displaying the valve stem closure member in its unseated position, thereby allowing the release of the fluid flowing out of the internal passage of the cylindrical housing.

DETAILED DESCRIPTION OF THE DRAWINGS

While this invention is susceptible of embodiment in many different forms, there is shown in the drawings and will herein be described in detail, one specific embodiment with the understanding that the present disclosure is to be considered as an exemplification of the principles of the invention and is not intended to limit the invention to the embodiment illustrated.

Pressure activated valve apparatus 10 is shown in exploded fashion in FIG. 1. The pressure activated valve itself comprises secondary housing cover 11 which consists of a tapered fluid-dynamic tip 12, and includes slotted flat 13 for use with a wrenching tool. Secondary housing 11, upon attachment to external threading means 25 of protruding valve attachment 23, along with valve seal 21, serves to isolate valve head element 14, valve spring 19, and valve stem valve head attachment member 30 from coming into contact with the incoming fluid 57 as shown in FIG. 7.

Valve spring 19, including top end 20, and bottom end 24, is operably positioned between the valve head element 14 and the protruding valve attachment 23, as shown in FIGS. 6 and 7. Valve head element 14 has upper head element 16 which is larger in size than the diameter of valve spring 19. Lower head element 15 of valve head element 14 is slightly smaller than the diameter of valve spring 19 to enable operable securement of the top end 20 of valve spring 19, as shown in FIGS. 6 and 7. Inner aperture 17 of valve head element 14 is slightly larger than the diameter of the narrow portion 31 of valve stem member 29 so that narrow portion 31 can slip through singular longitudinal slot 40 of valve head element 14, and rest therein as shown in FIG. 5. The top surface of valve head element 14 has recessed portion 18 so that the top surface of valve head attachment member 30 can be flush with the top surface of valve head element 14, while locking the position of valve 29 to valve head 14.

Pressure activated valve 10 also includes cylindrical valve housing 22 to which protruding valve attachment 23 is attached. Cylindrical wall 26 encases the internal passage 51 (as shown in FIG. 6), for the passage and retainment of fluid 57 (as shown in FIG. 7). Cylindrical housing 22 also includes first incoming end 27 and the second outgoing end 28, both of which are surrounded by recessed grooves 38 and 39, respectively, as shown in FIGS. 3 and 4 respectively, in which seals 44 and 43, respectively, are positioned, as shown in FIG. 6.

Valve 29 consists of valve head attachment member 30, valve stem member 32, narrowed valve stem portion 31, and valve stem closure member 33, which, when in its closed sealed position, restricts the flow of fluid 57, as revealed in FIG. 6. When closure member 33 is in its unseated position, it allows the flow of fluid 57 to pass through internal passage 51 and out aperture 56 of housing 22, into outgoing conduit 42 as shown in FIG. 7.

Pressure activated valve apparatus 10 is shown in FIG. 2 in its assembled form. Valve stem closure member 33 is shown in its seated position, as revealed in FIG. 6 and slotted flats 13 and 34 are oppositely positioned so that a wrench can be applied to secondary housing 11 for easy tightening or loosening of same. Also shown in FIG. 2 is cylindrical housing 22, and its outgoing and incoming ends 28 and 27, respectively. Additionally, tapered fluid-dynamic tip 12 of secondary housing 11 is also revealed.

As shown in FIG. 3 entry apertures such as holes 35, 36 and 37 are positioned around protruding valve attachment 23. Holes 35, 36 and 37 allow fluid 57 to enter into internal passage 51 of cylindrical housing 22 as shown in FIG. 6. The top of externally threaded region 25 accommodates spring bottom 24 of valve spring 19 as shown in FIGS. 6 and 7. Aperture 58 of protruding valve attachment means 23 permits valve 29 to be slidably positioned therewithin. First end 27 of the cylindrical housing 22, sealably co-operates with incoming conduit 47, as shown in FIG. 6.

Outgoing end 28 of cylindrical housing 22, with valve stem closure member 33 is further shown in FIG. 4. Recessed groove 39 which is used for sealable attachment to outgoing conduit 42, is also shown in FIG. 4 as well as in FIGS. 6 and 7.

Valve head element 14 is shown in FIG. 5, together with longitudinal slot 40, which is slightly larger than the narrowed portion of the valve stem member 31 so that it can be slidably positioned over that narrowed portion. Inner aperture 17 of valve head element 14 is also slightly larger than the narrowed portion of the valve stem member 31, while being smaller than the valve stem valve head attachment member 30 so that when valve head element 14 is operably attached thereto, the valve stem 29 will not slip through inner aperture 17. Portion 16 of valve head element 14, is positioned above portion 15 so that spring top 20 of valve spring 19 can pass portion 15 and rest against the bottom surface of valve head portion 16.

FIG. 6 shows pressure activated valve apparatus 10 in its closed, flow blocking position upon connection with incoming conduit 41 and outgoing conduit 42. The connecting end 47 of incoming conduit 41 is attached to first incoming end 27 of cylindrical housing 22. Leakproof fit is ensured through the use of seal 44, therebetween ends 47 and 27 which is positioned within recessed groove 38 and a similar groove in conduit 41, as shown in FIG. 3, and is further held in place through the use of apparatus attachment clamp 45. Second outgoing end 28 of cylindrical housing 22 is likewise attached to connecting end 46 of outgoing conduit 42. As is shown in FIG. 7, incoming fluid 57 travels over and past tapered fluid-dynamic tip 12 of secondary housing 11. The fluid then passes through entry holes, such as holes 52 and 53 of cylindrical housing 22, to enter into internal passage 51. Fluid 57 is retained within internal passage 51 as long as the pressure of fluid 57 is not strong enough to overcome the bias of valve spring 19. Valve 29, valve stem closure member 33 remains in its closed position, resting against valve seat 50, until the fluid pressure overcomes spring 19.

While fluid 57 passes through pressure activated valve apparatus 10 in the direction of the valve stem arrow, as shown in FIG. 7, the components within internal cavity 55 formed by secondary housing 11, that is, valve spring 19, valve head element 14, and valve head attachment member 30, are isolated from contact with fluid 57. These areas are protected through the sealed attachment of the secondary housing 11 to valve attachment means 23. Secondary housing 11 is equipped with internal threading 54 which is threaded on to external threading 25 of protruding valve attachment 23. Fluid 57 is further prevented from entering internal cavity 55 of secondary housing 11 through the use of seal 21 operably interposed between secondary housing cover 11 and valve attachment means 23. FIG. 6 additionally shows slotted flats 34 and 13, positioned opposite each other so that tightening and/or loosening of the secondary housing 11 can be achieved through use of a wrench, when housing 11 is exposed after incoming conduit 41 is removed from attachment with cylindrical housing 22. FIG. 6 also shows spring top 20 of valve spring 19, and valve stem member 32.

FIG. 7 shows pressure activated valve apparatus 10 in its fluid release position within, and attached to, incoming conduit 41, with outgoing conduit 42 attached to the opposite side of cylindrical housing 22. Fluid 57 flowing in the direction of the arrow, upon surpassing the pressure of bias spring 19, is released from the apparatus. When the bias of valve spring 19 is overcome by the pressure of fluid 57, valve stem closure member 33 of valve 29 is unseated from valve seat 50 to allow fluid 57 to flow through outgoing aperture 56 of cylindrical housing 22.

Fluid 57 is also shown flowing past tapered fluid-dynamic tip 12 of secondary housing 11, so as to minimize resistance to the flowing fluid 57. Upon entry of fluid 57 into internal passage 51 of cylindrical housing 22 fluid 57 is permitted to come into contact with valve stem member 32, which may itself be sealed (not shown) at its internal reciprocating contact point with valve attachment means 23, at position 65. Only minimal migration of fluid 57 occurs due to close tolerances of stem 32 within valve attachment 23. As can be seen, valve head attachment member 30 is operably attached to valve head element 14. Internal cavity 55 of secondary housing 11 is isolated from fluid 57, due to the operable attachment of internal threads 54, in secondary housing 11 with external threading 25 of protruding valve attachment means 23, as further sealed through use of valve seal 21.

Through such a construction, fluids, such as water or steam, pass efficiently about an isolated spring and valve head assembly, to avoid picking up and transmitting, during flow, contaminants from these metal objects; contaminants such as grease, oil, metal shavings, dirt and the like. Where such a fluid system co-operates in what should be a sanitary environment, such as for the processing of food, this isolation can be of substantial benefit.

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

What is claimed is:

1. An in-line pressure activated valve apparatus for integration into sanitary fluid conveyance systems for alternatively blocking and releasing the flow of said fluid therethrough, relative to the level of fluid pressure within said system, said apparatus comprising:

substantially cylindrical housing means having a first end at which said fluid is introduced through first aperture means and a second opposite end having second aperture means at which said fluid is alternatively blocked and released, said first end being operably attached to first incoming conduit means and said second end being operably attached to second outgoing conduit means, with said cylindrical housing means being positioned wholly axially and in-line between said first and said second conduit means, said cylindrical housing means further comprising internal fluid passage means, about the longitudinal axis of said cylindrical housing means, for permitting said fluid to flow between said first and second opposite ends of said cylindrical housing means, said cylindrical housing means further comprising substantially concentrically positioned outwardly protruding valve attachment means operably secured to said first end of said cylindrical housing means for operable positioning within a portion of said first incoming conduit means, valve means operably and springedly attached at said valve attachment means for reciprocation within and through said cylindrical housing means, said valve means comprising a valve stem member having a valve head at said first incoming end and a valve closure at said second outgoing end, opposite said first end, as well as spring biasing means operably interposed between said valve means and said cylindrical housing means, to enable biased reciprocation of said valve stem member to, in turn, seat and unseat said valve closure within said second aperture means, at said second end of said cylindrical housing means, to alternatively restrict and release, respectively, the flow of said fluid passing through said internal fluid passage means of said cylindrical housing means, said spring biasing means being operably interposed between said valve attachment means and said valve stem valve head, said level of fluid pressure serving to bear against said valve closure to overcome and compress said spring biasing means to unseat said valve closure from its seated position upon attaining a pre-determined pressure to, in turn, release said fluid from said second aperture at said second end of said cylindrical housing means, said spring biasing means co-operating with said valve closure to seat same against said second aperture to block the flow of said fluid through said internal fluid passage means of said cylindrical housing means until said spring biasing means is overcome by said pre-determined pressure of said fluid therewithin said cylindrical housing means, said spring biasing means further being longitudinally positioned axially and in-line with said cylindrical housing means, and located upstream of said cylindrical housing means within said first incoming conduit means, sealed secondary housing means operably and sealably attached to and about said outwardly protruding valve attachment means for isolating said spring biasing means, said valve head, and said valve attachment means from undesired contact with said fluid passing thereabout, said secondary housing means comprising a substantially fluid-dynamic shaped member to minimize resistance to the flow of said fluid passing from said first incoming conduit means through and into said pressure activated valve apparatus, said secondary housing means further being fixedly sealed, yet removably attachable to the outer periphery of said valve attachment means to enable facilitated access to said spring biasing means and said valve head for maintenance and replacement of same.

2. The pressure activated valve apparatus according to claim 1 in which the invention further includes a recessed groove at both said first and second end of said housing means to enable the provision of sealing means, to preclude against leakage of said fluid upon operable sealed attachment of said first end to said first incoming conduit means and of said second end to said second outgoing conduit means.

3. The invention according to claim 1 in which said first aperture means at said first end of said cylindrical housing means comprises a plurality of holes operably and radially positioned about the longitudinal axis of said cylindrical housing means, at a position proximate to the position from which said outwardly protruding valve attachment means emanates, to enable access of said fluid from said first incoming conduit means to and into said internal fluid passage means of said cylindrical housing means.

4. The invention according to claim 1 in which said second aperture means at said second end of said cylindrical housing means comprises a single release aperture for release of said fluid into said second outgoing conduit means, said second aperture means including valve seating means positioned thereabout the outside of said second aperture means for seating of said valve closure.

5. The invention according to claim 1 in which said valve attachment means comprises an outwardly protruding cylindrical stem member having externally threaded attachment means positioned thereabout for attachment of said secondary housing means, said secondary housing means including internally threaded attachment means for co-operation with and removable affixation to the externally threaded attachment means of said valve attachment means.

6. The pressure activated valve apparatus according to claim 1 in which the invention further comprises valve sealing means radially positioned relative to the longitudinal axis of said cylindrical housing means and concentrically positioned about the periphery of said valve attachment means, for precluding the inadvertent migration of said fluid into said secondary housing means attached to said valve attachment means, said valve sealing means being positioned around the lower emanating portion of said outwardly protruding valve attachment means where the bottom of said secondary housing means meets said cylindrical housing means, said valve sealing means bearing against the bottom of said secondary housing means to isolate the interior of same from said fluid.

7. The invention according to claim 6 in which said valve sealing means comprises a substantially elastomeric O-ring element.

8. The pressure activated valve apparatus according to claim 1 in which the invention further comprises spring retaining means for securing said spring biasing means between said cylindrical housing means and the valve head of said valve stem, said spring retaining means comprising a releasable valve head element operably and fixably attachable to the first end of said valve stem member.

9. The invention according to claim 8 in which said releasable valve head element includes a singular longitudinal slot radially positioned relative to the longitudinal axis of said valve head and valve stem for facilitated removal and replacement of same from about said valve stem member, said singular slot of said valve head element having a longitudinal opening larger than the diameter of said valve stem member.

10. The invention according to claim 1 in which said secondary housing means is substantially conical in shape so as to reduce said resistance to the flow of said fluid, said substantially conical-shaped secondary housing means including a tapered fluid-dynamic tip for further minimizing resistance to the flow of said fluid occurring about same, said taper of said tapered tip beginning at a position at least as high as the protruding distance of said valve stem relative to the first end of said cylindrical housing means, when said valve closure is in its seated flow blocking position.

11. The pressure activated valve apparatus according to claim 1 in which said secondary housing means includes at least two slotted flats oppositely positioned relative to each other on the outer periphery of said secondary housing means to enable wrenching, for tightening and loosening said secondary housing means from and about said valve attachment means.

* * * * *